(12) United States Patent
Willburger et al.

(10) Patent No.: US 10,238,123 B2
(45) Date of Patent: Mar. 26, 2019

(54) DEVICE AND METHOD FOR TRANSFERRING SAUSAGE PORTIONS

(71) Applicant: ALBERT HANDTMANN MASCHINENFABRIK GMBH & CO. KG, Biberach (DE)

(72) Inventors: Peter Willburger, Baindt (DE); Michael Heim, Biberach (DE); Siegfried Reutter, Eberhardzell (DE); Thomas Fischer, Gutenzell (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 690 days.

(21) Appl. No.: 14/940,591

(22) Filed: Nov. 13, 2015

(65) Prior Publication Data

US 2016/0143300 A1    May 26, 2016

(30) Foreign Application Priority Data

Nov. 26, 2014 (EP) .................... 14194999

(51) Int. Cl.
| | | |
|---|---|---|
| *A22C 11/00* | (2006.01) | |
| *A22C 17/00* | (2006.01) | |
| *A23L 13/60* | (2016.01) | |

(52) U.S. Cl.
CPC ........ *A22C 11/008* (2013.01); *A22C 17/0093* (2013.01); *A23L 13/65* (2016.08); *A23V 2002/00* (2013.01)

(58) Field of Classification Search
CPC ....... A22C 11/00; A22C 11/01; A22C 11/001; A22C 11/005; A22C 11/02; A22C 11/0245; A22C 11/10
USPC .............. 452/30–32, 35–37, 46–48, 51
See application file for complete search history.

(56) References Cited

U.S. PATENT DOCUMENTS

| | | |
|---|---|---|
| 5,057,055 A | 10/1991 | Michaud et al. |
| 2008/0257683 A1 | 10/2008 | Thoonsen et al. |
| 2009/0075577 A1 | 3/2009 | Stimpfl |

FOREIGN PATENT DOCUMENTS

| | | |
|---|---|---|
| DE | 102004056038 A1 | 5/2006 |
| EP | 1712135 A1 | 10/2006 |
| EP | 2364596 A2 | 9/2011 |

*Primary Examiner* — Richard T Price, Jr.
(74) *Attorney, Agent, or Firm* — McCoy Russell LLP

(57) ABSTRACT

The invention relates to a device and a method for transferring sausage portions with a supply transport device, at least one removal transport device, and at least one ejector for ejecting at least one sausage portion from the supply transport device onto the removal transport device. The removal transport device comprises a lower transport device and a holding device disposed thereabove between which the at least one sausage portion is transported.

19 Claims, 9 Drawing Sheets

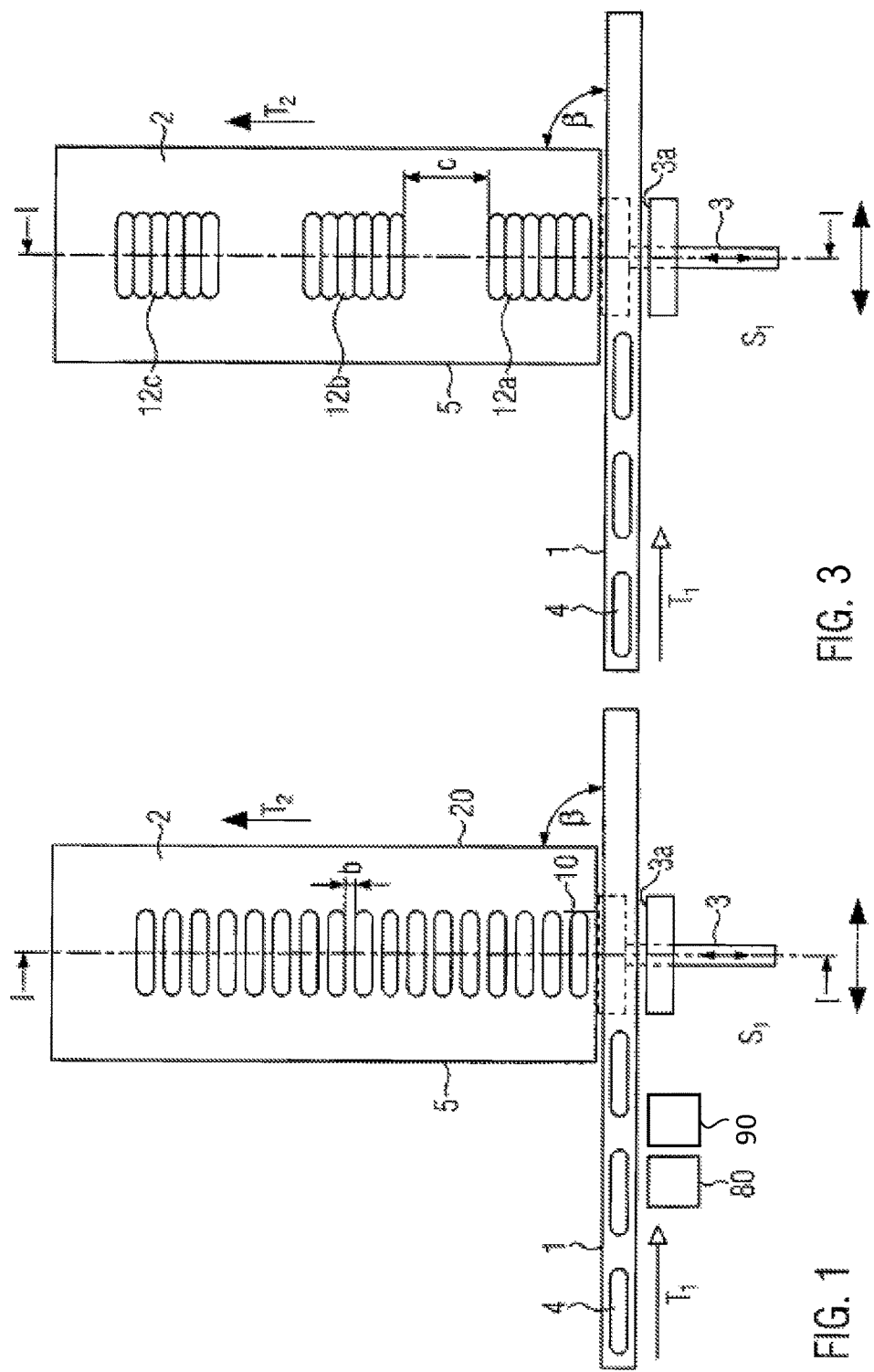

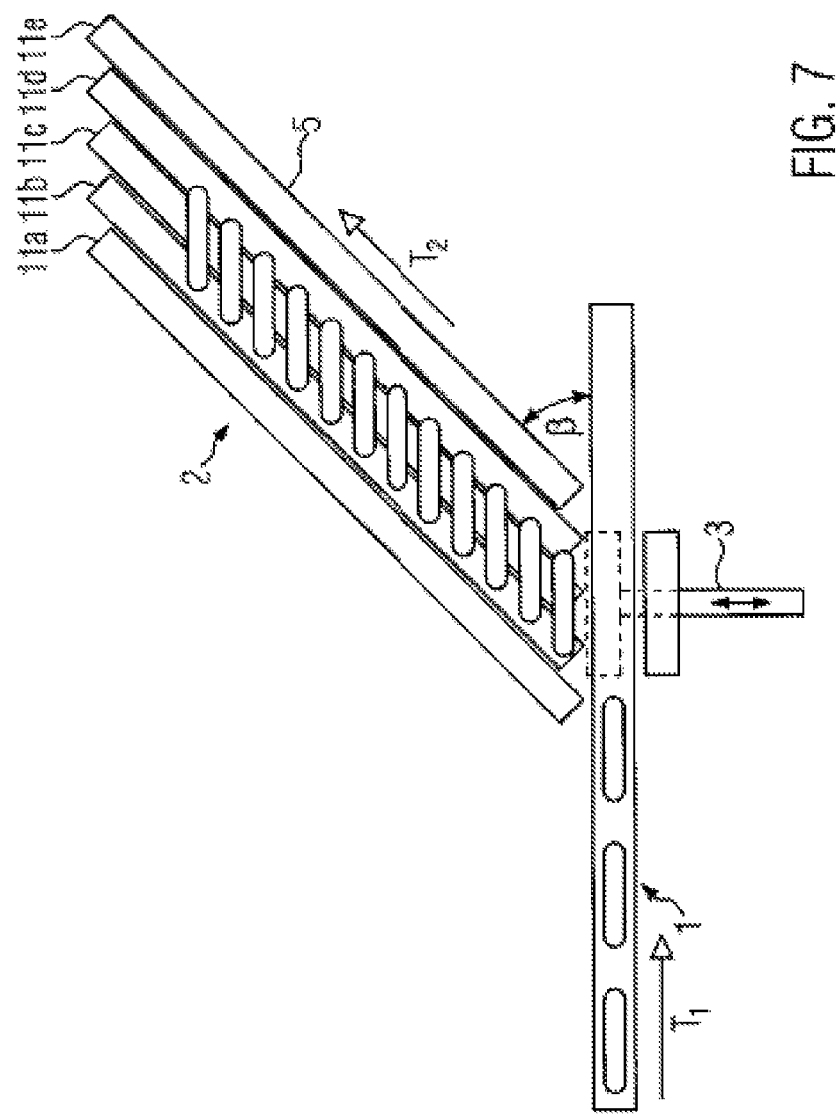

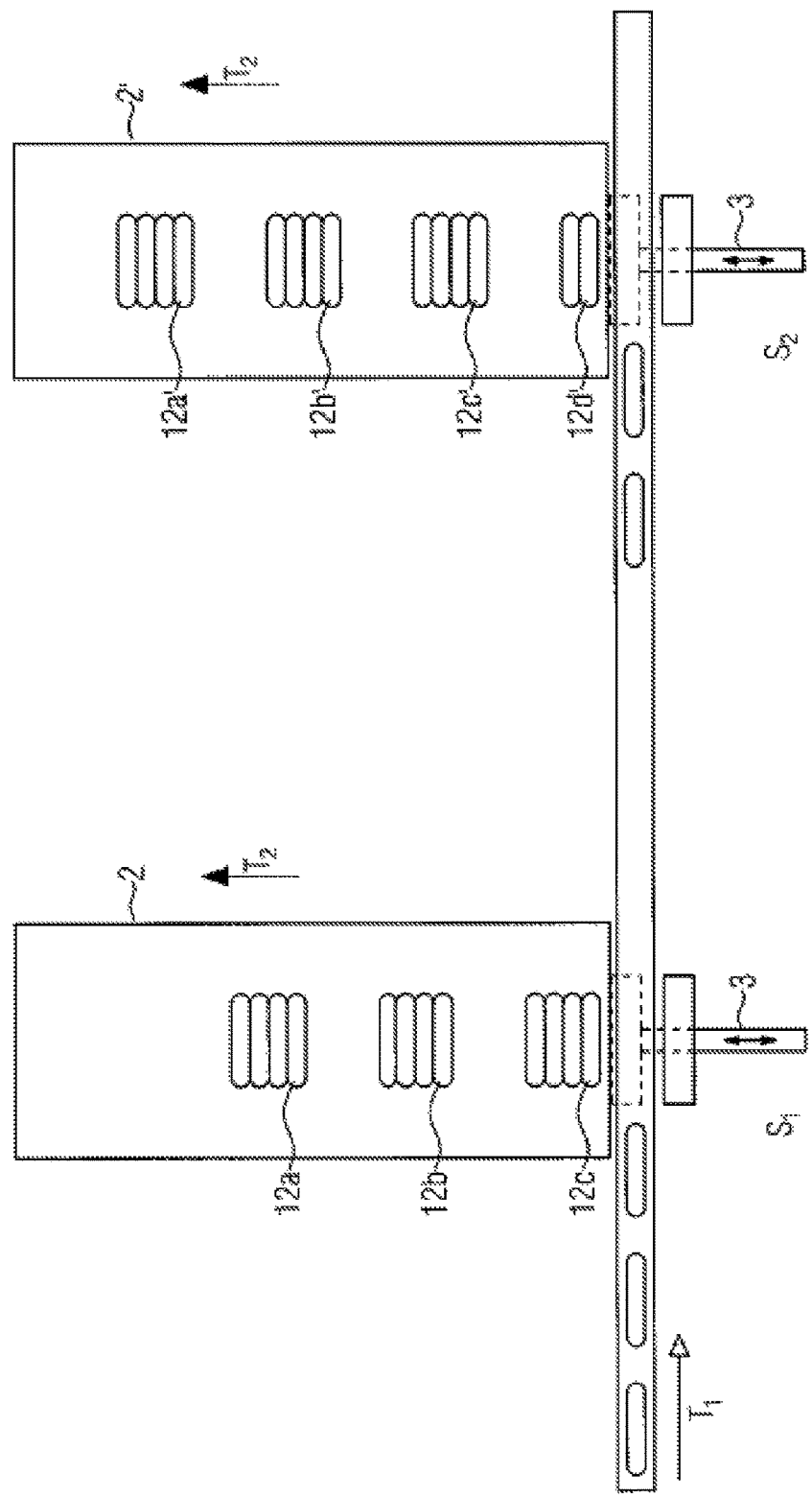

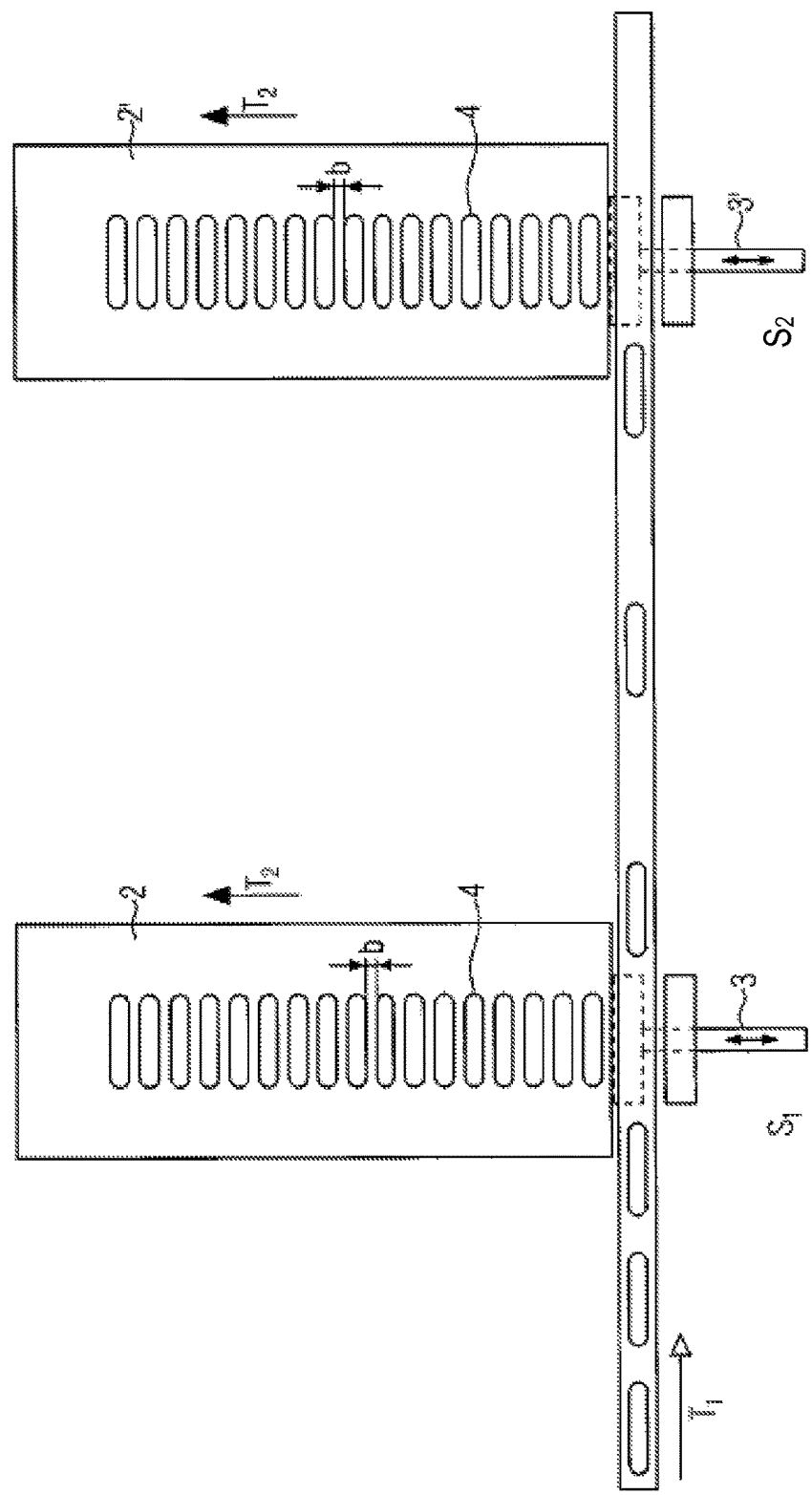

DEVICE AND METHOD FOR TRANSFERRING SAUSAGE PORTIONS

CROSS REFERENCE TO RELATED APPLICATIONS

The present application claims priority to European Patent Application No. 14 194 999.0, entitled "DEVICE AND METHOD FOR TRANSFERRING SAUSAGE PORTIONS," filed on Nov. 26, 2014, the entire contents of which are hereby incorporated by reference for all purposes.

FIELD

The invention relates to a device and a method for transferring sausage portions.

BACKGROUND AND SUMMARY

It is with fully automated processing of single or connected sausage portions, for example, when being supplied to packaging devices, often necessary to divide the product flow or to transfer it to another transport unit, e.g. to another conveyor belt. Further transportation of the products after being transferred can there occur parallel to the supply belt (0°) but also at an angle to the supply belt. It is for instance known from EP 1712135 to transfer sausage portions from a conveyor belt to a drum, in this case at an angle of 90°.

It has in prior art previously not been possible to transfer the individual sausage portions from one transport device, such as a conveyor belt, onto another while maintaining correct alignment of the sausages. For this reason, the individual sausage portions, as previously explained, had to be ejected in trays with respective receptacles aligning the sausage portions. This becomes particularly clear when considering the high processing speeds of 600 single sausage portions per minute.

Starting out from there, the present invention is based on providing a device and a method for transferring sausage portions that enables the sausage portions to remain correctly aligned when a sausage portion is transferred from a supply transport device to a removal transport device.

According to the present invention, a device is disclosed for transferring sausage portions with a supply transport device, at least one removal transport device, and at least one ejector for ejecting the at least one sausage portion device from the supply transport device onto the removal transport device. The removal transport device comprises a lower transport device and a holding device disposed thereabove, between which the at least one sausage portion is transported.

When at least one sausage portion is ejected from the supply transport device, the at least one sausage portion can therefore be securely received and held when transferred between the transport device and the holding device disposed thereabove. The sausage can maintain its correct alignment. Reliable transfer of the at least one sausage portion from the supply transport device onto the removal transport device is thereby possible.

The respective sausage portion that is moved on the supply transport device in a first direction of transport $T_1$ at a first conveying speed and also during the transfer still has a component of motion or momentum in the direction of transport $T_1$, is effectively decelerated and can be precisely placed by the holding device.

The term "sausage portion" is to be understood as a single sausage, where also several sausage portions, i.e. individual sausages being supplied in succession in the direction of transport on the supply transport device can be ejected simultaneously by an ejector onto the removal transport device. The individual portions, i.e. the individual sausages, can there be present separated from each other or as a string of sausages. A conveyor belt, a roller carpet etc. can by way of example be used as a supply transport device. Only one transport device can be provided, but according to a particular embodiment, several transport devices with respective ejectors can be provided in succession.

In the present invention, it is not necessary that the holding device extend over the entire length of the transport device. It is essential only that the holding device be located above a starting region of the transport device. The starting region is preferably understood to mean at least the first 5 cm—when viewed from the front end (the end facing the supply transport device)—this means that the holding device can in this region grip or hold the sausage portion.

The holding device is preferably also formed as a circulating transport device, in particular a conveyor belt, a roller, or a roller carpet. For example, the lower transport device can then advantageously be formed as a circulating conveyor belt and the holding device as a circulating conveyor belt disposed thereabove extending at least over part of the length of the lower conveyor belt. However, it is also possible to provide a roller in the starting region of the transport device which is either driven and, like the circulating transport device described above, can be driven at the same speed as the transport device, or which is mounted freely rotatable. It is also possible to configure the holding device as a sliding plate which is provided at least in the starting region of the transport device and on which the sausage portions transported in the second direction of transport $T_2$ slide along. If the sliding plate is resiliently mounted, it can adequately hold the sausage portions and perform compensating motions in an upwardly direction if required.

The distance between the holding device and the lower transport device can advantageously be adjusted via an adjustment mechanism. The distance can thereby be adjusted to different sausage calibers, i.e. sausage diameters. The distance between the holding device and the transport device is there approximately in a range of 70% to 100% of the sausage caliber.

The supply transport device as well can at least in the transfer region comprise a holding device and a transport device disposed therebeneath between which the individual sausage portions are transported. The ejector then for ejecting moves between the holding device and the transport device and ejects the sausage portion onto the removal transport device. The sausage portion is therefore held reliably and remains correctly aligned during the entire transfer process.

According to a preferred embodiment, the device comprises a controller 90 that controls a drive of the removal transport device such that it transports the sausage portions at a speed to set a predetermined distance between the sausage portions relative to each other, where the speed preferably depends on at least one of the following parameters:

the transport speed of the supply transport device, clock frequency of the ejector, the set nominal distance of the sausage portions in the direction of transport $T_2$ of the removal transport device, the sausage caliber, the number of ejected portions.

The distance between sausage portions on the removal transport device can according to the present invention thereby be set accurately and also various grouping assignments in which sausage groups can be obtained in which individual sausage portions have a certain distance to each other, where the individual sausage groups in turn have a predetermined distance to each other. The speed of the transport device can also be variable, for example, for creating different group gaps, or where individual sausage portions are in clocking operation to be positioned directly in succession in the removal transport device.

The device can also have several—when viewed in the direction of transport $T_1$—successively disposed ejectors. The sausage portions can therewith be transferred respectively to a plurality of removal transport devices. The sausages can there be pushed off to the same side or be ejected on opposite sides, this means the removal transport devices are then located on both sides of the supply transport device.

The at least one removal transport device extends in a second direction of transport extending at an angle of 0° to 100°, preferably 0° to 90°, relative to the direction of transport $T_1$ of the supply transport device. If the angle is 0°, then the removal transport device extends parallel to the supply transport device. At an angle of 90°, the removal transport device is disposed perpendicular to the supply transport device. In a range between 0° to 90°, the second direction of transport $T_2$ has a directional component in the direction of transport $T_1$, whereas at an angle greater than 100° the removal transport device again extends diagonally backwards, i.e. has a directional component which is opposite to the first direction of transport $T_1$. The removal transport device or its lower transport device, respectively, can be configured as a circulating conveyor belt, but can also comprise several mutually parallel conveyor belts or straps. The configuration of several belts allows for an arrangement of the removal conveyor belt relative to the supply conveyor belt at an angle that does not correspond to 0° and not to 90°, i.e. in an angular range between 0° and 90° and greater than 90° to 100°. By using several individual belts, the removal transport device can be disposed very close to the supply transport device because the distance to the supply transport device can for each belt can be minimized, whereas a gap between the supply transport device and the removal transport device would arise in these angular ranges when using a broad belt which enables no reliable transfer. The lower transport device there comprises the several adjacently disposed conveyor belts. It is also possible that the holding device comprises several adjacently disposed circulating conveyor belts.

The ejector is preferably configured and arranged such that it is movable in a direction perpendicular to the direction of transport $T_1$ of the supply transport device. The ejection area of the removal transport device is there advantageously disposed parallel to the direction of transport $T_1$, so that the ejection area can act at the long side of the sausage portion.

It is also possible that the ejector is moved in a direction having a component of motion perpendicular to the direction of transport $T_1$ of the supply transport device as well as a component of motion opposite to the direction of transport $T_1$ of the supply transport device. In particular a pivot mechanism can there be provided. The sausage portion being moved on the supply transport device at a first speed can, due to the backward motion, be decelerated during the transfer process so that a more secure transfer process is possible. If the ejector is pivoted in, it is advantageously moved back in the same way from the area of the supply transport device after transferring the sausage portion so as not to obstruct the trailing sausage.

The ejection area of the ejector can be oriented at an angle or parallel to the direction of transport $T_1$ of the supply transport device and is in particular movable linearly at an angle inclined relative to the transport device. This means that the ejector does not move perpendicular to the direction of transport $T_1$, but inclined thereto. This can be advantageous, for example, when the removal transport device is disposed at a certain angle relative to the supply transport device. The ejector can there be moved linearly at this angle and the ejection area can be aligned perpendicular to this direction.

The device advantageously comprises a stop which is arranged at least in the starting region of the removal transport device and is positioned transverse to the direction of transport $T_1$ of the supply transport device in order to decelerate the sausage portions in the direction of transport $T_1$ of the supply transport device. A respective stop again allows precise alignment of the sausage on the removal transport device. The stop can also be designed as a vertically arranged co-traveling conveyor belt, e.g. at the same speed as the removal transport device.

It is particularly advantageous if the sausage portions are ejected laterally at several locations from the supply transport device. Where $n_1$ sausage portion(s) are successively ejected at a first location $S_1$ onto the removal transport belt in that the ejector is actuated successively $n_2$ times (n1, n2, n3, etc.). If only one respective sausage portion is ejected at a certain point in time by the ejector, then this results in $n_1 = n_2$.

A certain number $n_3$ of sausage portion(s) is then not ejected at the first location $S_1$ by the ejector but passes this location $S_1$. The passing sausage portions are then ejected at at least one further location $S_2$, $S_3$ by a respective ejector.

When the first removal transport device, for example, runs at a constant speed, an area not occupied by sausage portions arises on the first removal transport device, i.e. a distance between two sausage groups each having $n_1$ sausage portions can be created. If sausage portions are at the first location $S_1$ ejected by the ejector, then no sausage portions continue to the further locations $S_2$ or $S_3$, so that unoccupied areas on the respective removal transport devices then arise so that a distance between individual sausages groups each having a certain number of sausage portions can then be created. By adjusting the speed of the removal transport device, these gaps can be further increased or decreased.

After a certain number $n_3$ has passed the first location $S_1$ and a sufficient distance is created between the sausage groups, the first step again follows, namely that $n_1$ sausage portion(s) are ejected successively onto the removal transport device at location $S_1$. It is possible, however, that $n_1 = n_3$, $n_1$ and $n_3$ can also differ so that different groupings or grouping patterns can be created on different removal transport devices.

It is possible that faulty products, such as ruptured sausages or those that deviate from the desired length or from a desired shape or a desired curvature, respectively, are discharged at the end of the supply transport device. The faulty products are there detected by respective sensors. If it is detected that a faulty product exists, then the ejector is not actuated and does not push this sausage portion onto the removal transport device. In order to prevent a gap from arising on the removal transport device, the speed of the removal transport device can be adjusted accordingly by the controller 90, this means for example, the speed can be reduced for a moment or the removal transport device can be stopped for a moment so that the number of discharged products can be balanced and again be completed.

It is particularly advantageous if the direction of curvature of the sausages is detected and the sausages having a certain same direction of curvature are ejected on a respective removal transport device, this means that sausage portions having an opposite direction of curvature are ejected onto a further removal transport device or are removed via the supply transport device.

The holding device, in particular the transport roller or the conveyor belt, advantageously comprises a surface profile. This ensures that the sausages transferred by the supply transport device can be well gripped by the removal transport device.

Advantageously, at least parts of the ejector are movable in or opposite to the direction of transport of the supply transport device. The push-off position can thereby be correctly adjusted, for example, with changing distances and sausage portion lengths, such that the center of a sausage portion can also come to rest at the center of the ejection area of the ejector. Either the entire ejector can there be movable in or opposite to the direction of transport, or at least a portion comprising the ejection area.

The device advantageously comprises a sensor that detects the position of the sausage portion and preferably the sausage portion length at a point in time, and the controller 90 determines the ejection time of one of the at least one ejectors in dependence of the respective signals. The sensor is in the direction of transport preferably located upstream of the at least one ejector. It is thereby always ensured that the ejector is actuated at a correct point in time and that the ejected sausage portion is in a correct position.

In addition, the push-off position can in the direction of transport $T_1$ be varied such that the position of the sausage portion on the removal transport device can be adjusted. This means that the sausage portions can be positioned on the removal transport device either further ahead or further behind in the direction of transport $T_1$. This sensor detecting the position of the sausage portion can at the same time also be the sensor determining whether the respective sausage portion is discharged—for example, detect the curvature of the sausage portion and/or sausage ruptures etc.

BRIEF DESCRIPTION OF THE FIGURES

The invention shall be explained below in more detail with reference to the following figures.

FIG. 1 schematically shows a horizontal section through one embodiment of the present invention with a removal transport angle β of 90°.

FIG. 3 schematically shows the embodiment shown in FIG. 1 with a different grouping assignment.

FIG. 7 shows a horizontal section through a further embodiment according to the present invention with a removal transport angle β=45°.

FIG. 8 shows a horizontal section through a further embodiment according to the present invention with two ejection locations to them same side and a removal transport angle β of 90°.

FIG. 9 shows the embodiment shown in FIG. 8 with a different grouping assignment.

DETAILED DESCRIPTION

Figure 6:
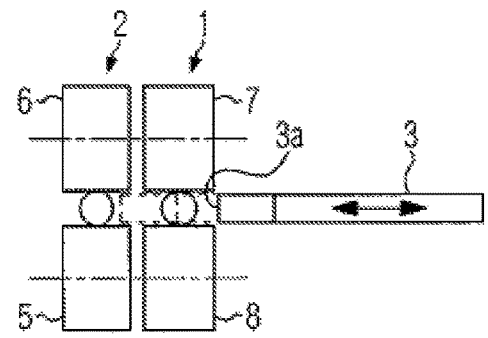
FIG. 6 shows a section through an embodiment shown in FIG. 5B along the line III-III.

FIG. 1 shows a horizontal section through an embodiment according to the present invention, where the removal transport or transfer angle is β=90°, this means the angle between the direction of transport $T_1$ of a supply transport device 1 and the direction of transport $T_2$ of a removal transport device 2. The device comprises an ejector 3 which, as shown by the arrow, is movable to and fro and can eject a sausage portion 4 from supply transport device 1 onto removal transport device 2.

Supply transport device 1 can be configured as a circulating transport device, for example, a conveyor belt, a roller carpet etc., with a respective drive and can move at a first transport speed $v_1$. As is particularly evident also from FIG. 2, supply transport device 1 can comprise a lower transport device 8 as well as a holding device 7 extending at least partially over the length of the lower transport device. Both lower transport device 8 as well as holding device 7 can there be configured as circulating transport devices. This results, for example, in a respective twin-belt between which sausage portion 4 can be held and transported in the direction of transport $T_1$. The holding device and the lower transport device are there preferably driven at the same speed. Supply transport device 1 advantageously comprises the holding device at least in a transfer region $S_1$ where an ejector 3 ejects the sausage portion. The holding device can be configured as a sliding plate or a resilient sliding plate, as shall be explained in more detail in connection with FIG. 13.

Figure 2:
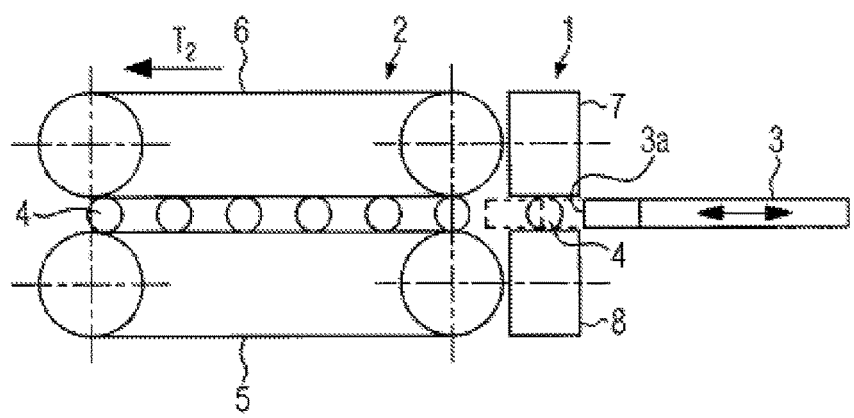
FIG. 2 schematically shows a longitudinal section through the embodiment shown in FIG. 1 along the line I-I.

As illustrated in FIG. 2 showing a section along the line I-I of FIG. 1 (with the exception that an additional sausage portion 4 is shown in the supply transport device in FIG. 2), the removal transport device 2 there as well comprises a lower transport device 5 and a holding device 6 located thereabove. Transport device 5 and holding device 6 are in this embodiment configured as circulating conveyor belts.

The distance between lower transport device 8, 5 and holding device 7, 6 can be adjusted via an adjustment mechanism—not shown—and there be adapted to a specific sausage caliber. The distance between the transport device and the holding device there preferably corresponds to 70% to 100% of the sausage caliber.

In the present invention, it is not necessary that holding device 6 of removal transport device 2 extends over the entire length of transport device 5. It is essential only that holding device 6 be located above a starting region a (see also FIG. 13A) of transport device 5. The respective sausage portion, being moved on supply transport device 1 in a first transporting direction $T_1$ and also still having a component of motion or momentum in the direction of transport $T_1$ during the transfer, is effectively decelerated by holding device 6. Sausage portions 4 being ejected from supply transport device 1 can be reliably received and held by holding device 6. The sausage can maintain its correct alignment. Due to the fact that supply transport device 1 also comprises a holding device in this embodiment at least in the transfer region, the sausage portion can throughout the entire transfer process be held and transferred in a correct position.

Ejector 3 is there designed such that ejection area 3a presently being oriented parallel to the direction of transport $T_1$ is moved through the gap between holding device 7 and transport device 8 (see dotted lines) to push the sausage portions from the supply transport device. Sausage portion 4 is then pushed onto lower transport device 5, held by holding device 6 and further transported in the direction of transport $T_2$.

Figure 13A:
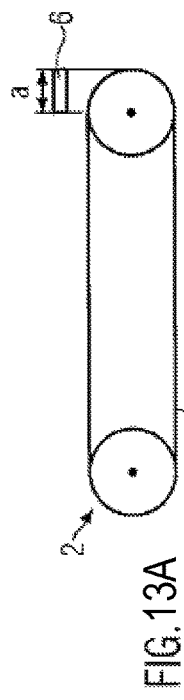
FIGS. 13A-D show different embodiments of a holding device for the removal transport device according to the present invention.
Figure 13B:
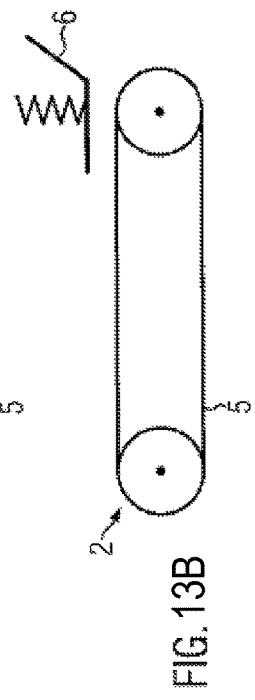
Figure 13C:
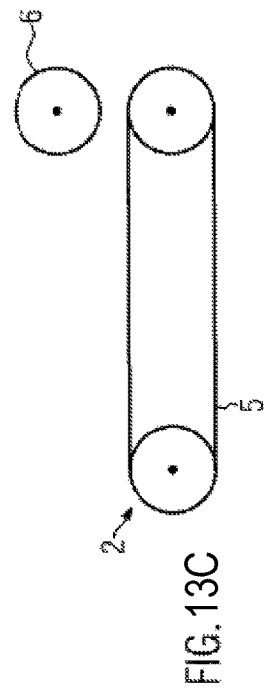

As mentioned above, holding device 6 may be disposed at least in the starting region a (see FIG. 13A), comprising an area 0 to 5 cm from the front end of the removal transport device. As shown in FIG. 13B, the holding device can also be configured as a sliding plate 6 which is at least in the starting region a located above transport device 5. Sliding plate 6 can be resiliently mounted, as shown in FIG. 13B, to compensate for variations in the sausage caliber. The distance of sliding plate 6 to transport device 5 can also be adjusted. As is apparent from FIG. 13C, holding device 6 can be designed in the form of a driven or rotatably mounted roller which is also disposed in starting region a.

Figure 13D:
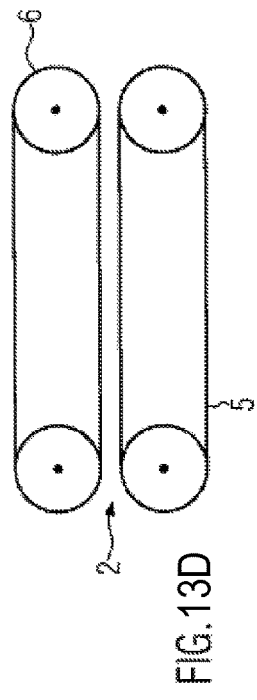

FIG. 13D shows the embodiment of the removal transport device as a twin belt with a lower conveyor belt as the transport device and an upper transport device 6 as the holding device.

The embodiments for a holding device shown in connection with FIGS. 13A to 13D also apply to a holding device 7 of the supply transport device, but holding device 7 of the supply transport device should preferably be configured as being co-traveling with the supply transport device. The holding device for the supply transport device can be, for example, a conveyor belt, at least one roller, a roller carpet or more generally a device for pressing the sausage portions onto the lower conveyor belt to improve entrainment.

Figure 12:
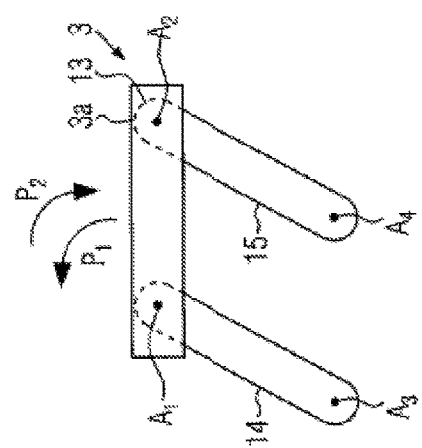
FIG. 12 shows a particular embodiment of an ejector according to the present invention.

As shown in FIG. 1, ejector 3 there moves to and from perpendicular to the direction of transport $T_1$. However, it is also possible to provide a pivoting device which makes it possible that ejection area 3a is with a pivotal motion (see FIG. 12, arrow $P_1$) pivoted onto sausage portion 4 so as to eject it from supply transport device 1 and, as illustrated by arrow $P_2$, can after the ejection again be pivoted back to a starting position. The hinge parallelogram, for example shown in FIG. 12, is suitable as a pivot mechanism, where the ejection member 13 is movably connected to ejection area 3a about the axes $A_1$ and $A_2$ to parallel legs 14, 15. Legs 14 and 15 are each mounted rotatably about axes $A_3$ and $A_4$. Ejection member 13 is thereby during the pivoting motion always parallel to the direction of transport $T_1$.

The device further advantageously comprises a controller 90 that controls a drive of removal transport device 2, this means controlling the transport device of the removal transport device and possibly also the holding device such that it transports the sausage portions at a speed $V_2$ in order to adjust a predetermined distance b between sausage portions 4 relative to each other (see FIG. 1, for example). The controller 90 also controls the speed $V_1$ of supply transport device 1. The controller 90 further controls the functions of ejector 3, this means the time when the ejector ejects a sausage portion and the speed of the ejector. The speed $V_2$ of removal transport device 2 depends, for example, on at least one of the following parameters: transport speed $V_1$ of supply transport device 1, the clock frequency of ejector 3, the sausage caliber, the set nominal distance b of the sausage portions in the direction of transport $T_1$ of removal transport device 2, the number of portions ejected at this location. The distance b between the sausage portions on the removal transport device can therefore according the present invention be accurately adjusted. Also various grouping assignments can be realized in which sausage groups are created at a distance c (see FIG. 3, for example). This speed $V_2$ can be varied to produce different group distances or for clocked operation. A stop 10, for example, in the form of a fixed stop, can be arranged between lower transport device 5 and holding device 6 disposed thereabove for further decelerating and aligning sausage portion 4 being transferred from supply transport device 1 and still having kinetic momentum in the direction of transport $T_1$. A conveyor belt, being perpendicular to transport device 5, can instead of a fixed stop 10 be disposed—when viewed in the direction of transport $T_1$—at the rear edge 20 of transport device 5 or holding device 6 disposed thereabove and serve as a stop and at the same time move the sausage portions in the direction of transport $T_2$. The timing when the ejector arrives at the sausage portion can also be set with the controller 90. Also the position at which the sausage portion comes to lie transverse to the direction of transport $T_2$ on transport device 2 is thereby determined. The controller 90 knows the position of the sausage portion in dependence of time.

The controller 90 therefore either knows the position of the sausage portion in dependence of time because it is connected to an upstream device, such as filling machine, or is part of this device and therefore receives signals at certain points in time about the positions of the sausage portions. Since also the speed of supply transport device 1 and the distance to the respective supply transport device 1 is known, the time can be accurately determined when the selected ejector is to arrive at the sausage portion to eject it. It is there advantageous if the controller 90 also receives signals related to the sausage portion length so that ejector 3 ejects the sausage portion when the sausage portion is directly in front of ejection area 3a. Alternatively, a sensor device can be provided which is indicated in FIG. 1, for example, by reference numeral 80. The front and the rear end of the sausage position can be detected by this sensor, for example an optical sensor, from which the position of the sausage portion can be determined at any given time. With the distance to ejector 3 and the speed of supply device 1, the exact time can then be calculated at which, for example, the center of a sausage portion can be ejected from the center of ejection area 3a (as viewed in the direction of transport $T_1$). The accuracy of the placement position can thereby be improved.

The position can also be influenced in that ejector 3 is movable mechanically in the direction of transport $T_1$ also while supply transport device 1 moves in the direction of transport $T_1$. If ejector 3, or at least a part which comprises ejection area 3a, in the Figures, for example, the part that comprises ejection area 3a, is movable in the direction of transport $T_1$ and in the direction opposite to the direction of transport $T_1$, then it can always be ensured that a sausage portion is during ejection with its central region in the central region of ejection area 3a. In addition, the position of the sausage portion on removal transport device 2 can be adjusted in the direction of transport $T_1$.

In one example, the controller 90 includes instructions stored in memory that when executed cause the controller 90 to carry out one or more routines described herein. The controller 90 may receive signals from a various sensors described herein (e.g., sensor 80) and employ various actuators (e.g., conveyor belt drives) to adjust the device based on the received signals and instructions stored on the memory of the controller 90.

FIG. 3 shows the embodiment shown in FIG. 1 with a different grouping assignment. While the sausages are in the grouping assignment shown in FIG. 1 pushed successively onto removal transport device 2 such that they have a constant predetermined distance b from each other, several sausage groups 12a, b, c are created in FIG. 3 each having a certain number of individual sausage portions 4, where the sausage groups also have a certain distance c from each other. The distance c can be created in that, for example, removal transport device 2 is moved faster once a sausage group was fully placed onto removal transport device 2, or in that sausage portions 4 pass location $S_1$ without ejector 3 being actuated by the controller or no sausages are supplied during a period of time via the supply transport device. If the distance c between the sausage portion groups has been obtained, then ejector 3 is again actuated and ejects the sausage portions of the next group.

Figure 4:
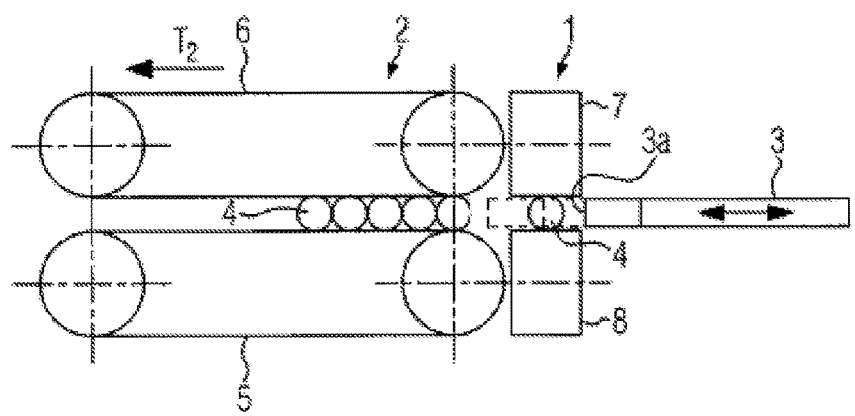
FIG. 4 shows a longitudinal section along line I-I through the embodiment shown in FIG. 3 with a respective grouping assignment.

FIG. 4 shows a section along the line I-I in FIG. 3, where here as well, however, one sausage portion 4 is shown in the supply transport device.

Figure 5A:
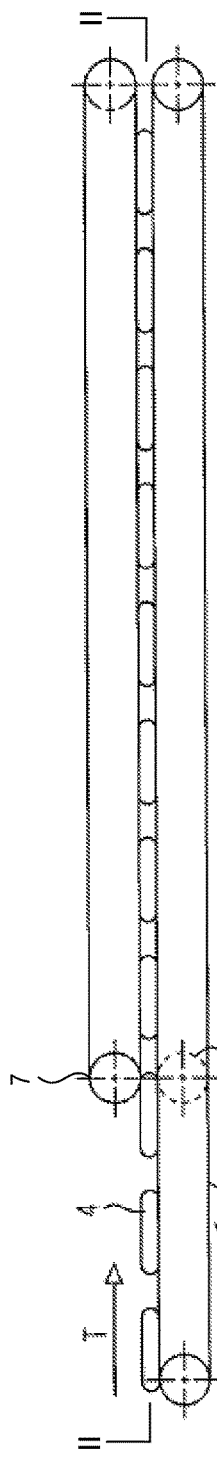
FIG. 5A shows a side view of the supply transport device with a holding device according to a further embodiment of the present invention with a removal transport angle β of 0°.
Figure 5B:
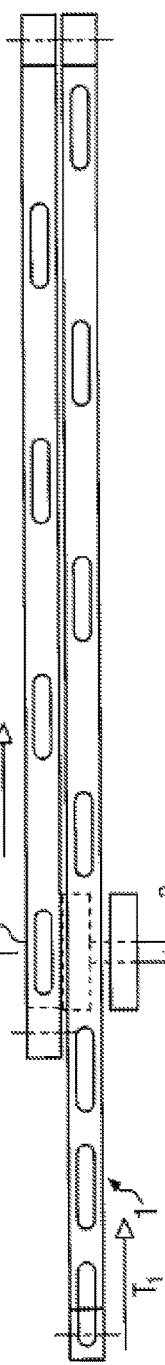
FIG. 5B shows a section along the line II-II with a first grouping assignment.

FIGS. 5A-D show an embodiment corresponding to the previous embodiments, but in which the removal transport angle β=0°, this means that removal transport device 2 runs parallel to supply transport device 1. FIG. 5A shows a longitudinal section through supply transport device 1, where supply transport device 1 above its transport device 8, presently the conveyor belt, also comprises a holding device 7, presently also designed as a conveyor belt. FIG. 5B shows a section along line II-II of FIG. 5A. It is clear from FIG. 5B that removal transport device 2 is disposed parallel to supply transport device 1, where the sausage portions can by ejector 3 be ejected onto removal transport device 2 as previously described.

FIG. 6 is a section along the line III-III of FIG. 5B and shows that both the supply transport device as well as removal transport device 2 at least in the transfer region in addition to a lower transport device 5, presently a conveyor belt, also comprise a holding device 6, 7, presently also in the form of a conveyor belt. Ejector 3 can be moved to and fro between the respective transport devices 5, 8 and holding devices 6, 7, as is illustrated by the arrows.

Figure 5C:
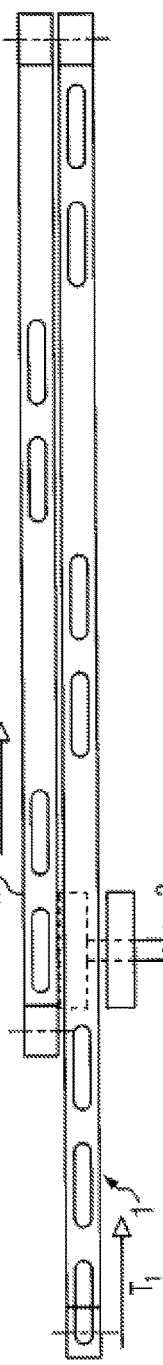
FIG. 5C shows the arrangement shown in FIG. 5B with a further grouping assignment.
Figure 5D:
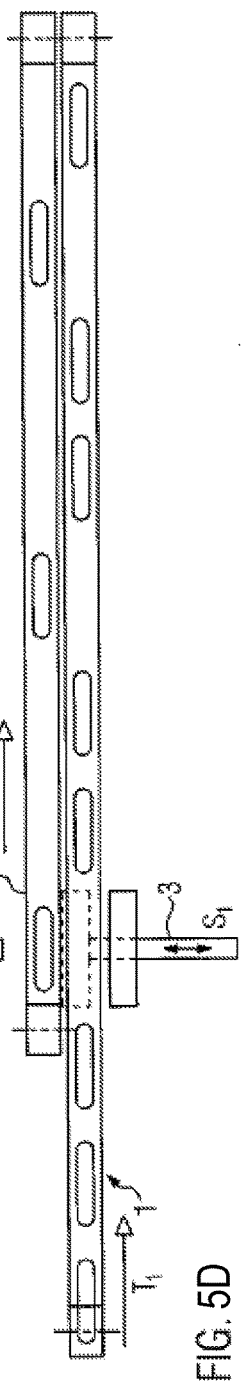
FIG. 5D shows the arrangement shown in FIGS. 5B and 5C with yet a further grouping assignment.

As is apparent from FIGS. 5A-D, the product flow can there be divided, where the direction of transport is maintained and the number n of transferred sausage portions can be chosen at random. In FIG. 5B, the controller controls the ejector such that, for example, every second sausage portion is transferred. In FIG. 5C, respectively 2 consecutive sausage portions are ejected, then two sausage portions pass location $S_1$ without ejector 3 being actuated, etc. In FIG. 5D, a sausage portion is ejected, two subsequent sausage portions remain on the supply transport device and only then is a respective sausage portion again ejected. Any groupings are possible.

FIG. 7 shows an embodiment in which removal transport device 2 conveys the sausage portions in a direction $T_2$, where $T_2$ extends at a removal transport angle β of 45° relative to the direction of transport $T_1$. In order be able to connect to the supply transport device 1 to the transport device 2 as close as possible also in angle ranges unequal to 90° and unequal to 0°, several conveyor belts 11a, b, c, d, e disposed in parallel are provided there. As shown in FIG. 7, transport device 5 there comprises the several adjacently disposed conveyor belts 11a to e. It is also possible that the holding device comprises several adjacently disposed circulating conveyor belts and then extends at least in the starting region, as previously explained. Approximately two to 10 conveyor straps or belts are there preferably provided, where the individual belts are each 1 cm to 5 cm in width.

FIG. 8 shows an embodiment which essentially corresponds to the preceding embodiments, where the sausage portions are there successively ejected at several locations $S_1$, $S_2$ onto a respective removal transport belt 2, 2'. Ejection is there respectively effected to the same side. A corresponding arrangement allows dividing the product flow, where a gap thereby arises in a temporally-delayed manner at the second ejector 3' and the associated removal transport device 2' by ejecting a sausage portion at the first ejector 3. If several portions are immediately ejected successively at first ejector 3 and the speed of transport device 2 is selected such that the portions come to rest close to each other at a certain distance b or without any spacing, groups 12 automatically arise on removal transport belts 2, 2' with a predetermined number of sausage portions 4.

Where $n_1$ sausage portions can be ejected successively at the first location $S_1$ onto removal transport belt 2, the ejector is actuated consecutively $n_2$ times. If only one respective sausage portion is ejected at a certain point in time by the ejector, then $n_1=n_2$ results as shown in FIG. 8. In this grouping assignment, n=4.

A certain number $n_3$ of sausage portions is then not ejected at the first location $S_1$ by the ejector but passes this location $S_1$. The passing sausage portions 4 are then ejected at at least one further location, presently at a further location $S_2$, by a respective ejector 3'. By selecting the speed of removal transport device 2', groups 12a', 12b', 12c', and 12d' arise here as well that have a respective distance to each other. In FIG. 8, two sausage portions are still missing for the last group 12d' and are still to be transferred by ejector 3. There, $n_3=n_2$ is applicable and ejector 3' is for creating a group likewise actuated $n_2$ times.

Although not shown, it would be possible that sausage portions pass the first location $S_1$ and are not ejected and pass also the second location $S_2$ and are not ejected, are then supplied to a third or several locations to there be transferred to a respective removal transport device 2.

FIG. 9 corresponds to the embodiments shown in FIG. 8 with a different grouping assignment. Every second sausage is there via a first ejector 3 ejected onto removal transport device 2 at location $S_1$. As with the preceding embodiment, the non-ejected sausage portions are then ejected at at least one further location $S_2$ via a further ejector 3', in this embodiment via a second ejector. The distance b of the sausages to each other can be adjusted by selecting the speeds of the removal transport devices 2, 2'.

Figure 10:
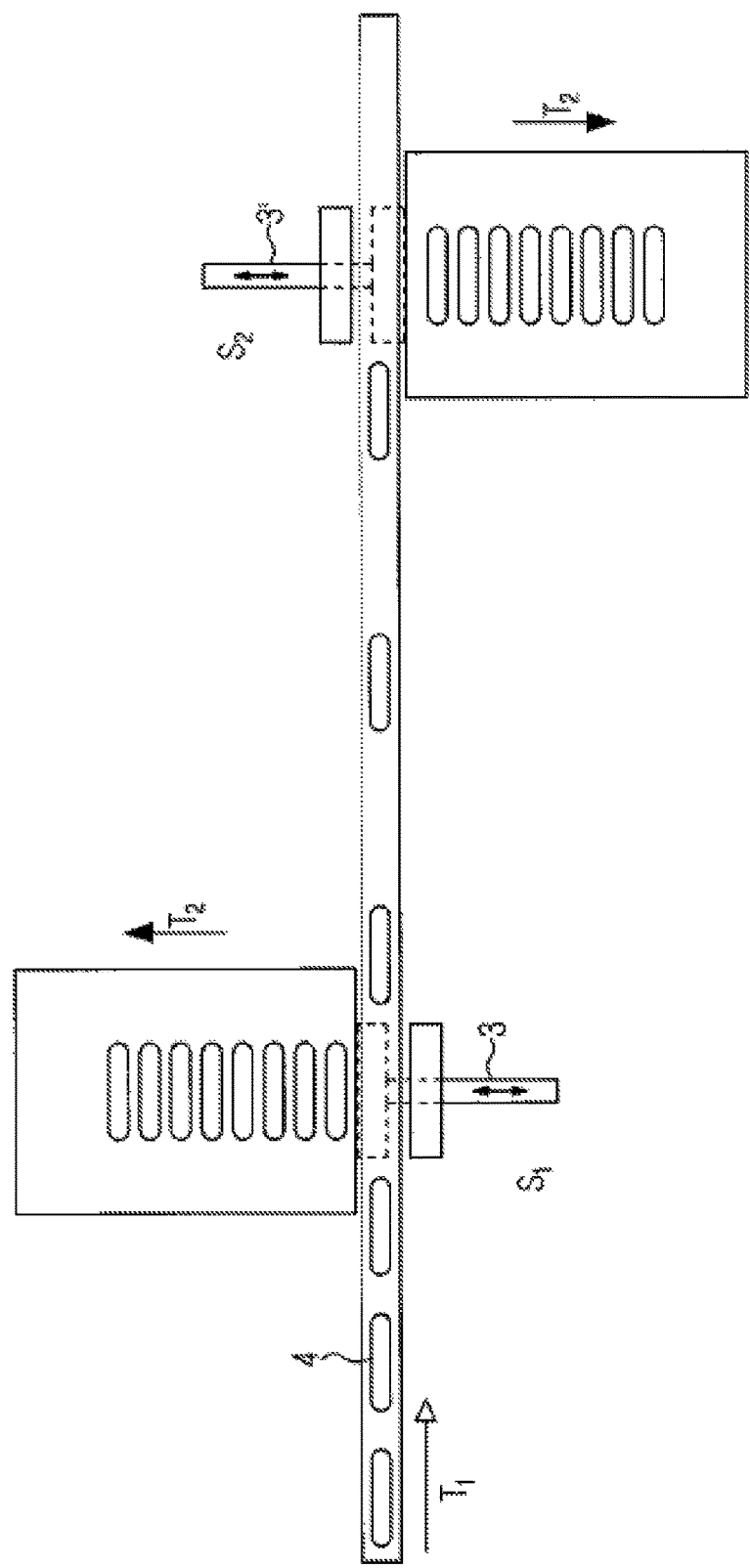
FIG. 10 shows a horizontal section through a further embodiment with two ejection locations to two different sides and a removal transport angle β of 90°.

FIG. 10 shows an embodiment which essentially corresponds to the preceding embodiments with the exception that the sausages are there ejected at several locations via respective ejectors 3, 3' in different ejection directions relative to supply transport device 1. For this purpose, ejectors 3, 3' are arranged on different sides of supply transport device 1. The grouping assignment in FIG. 10 corresponds to the grouping assignment in FIG. 9.

Figure 11A:
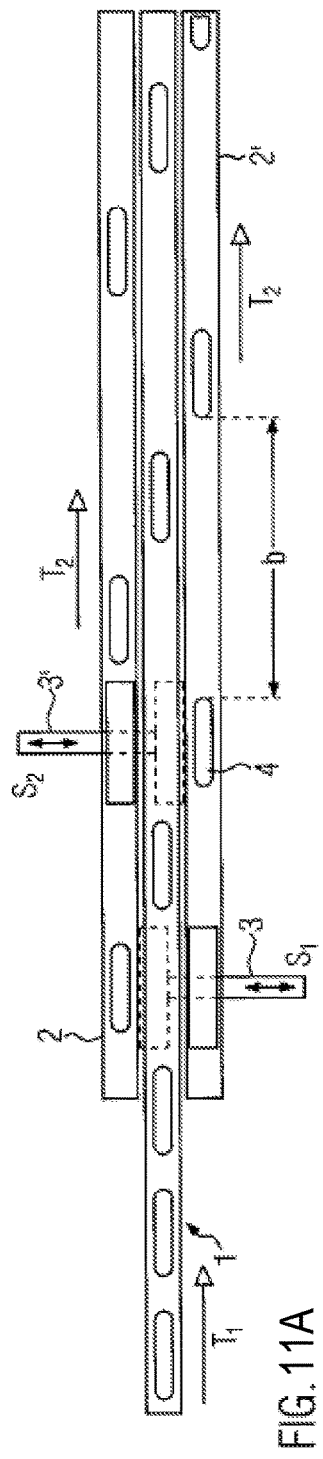
FIG. 11A shows a horizontal section through a further embodiment with two ejection locations and a removal transport angle β of 0°.
Figure 11B:
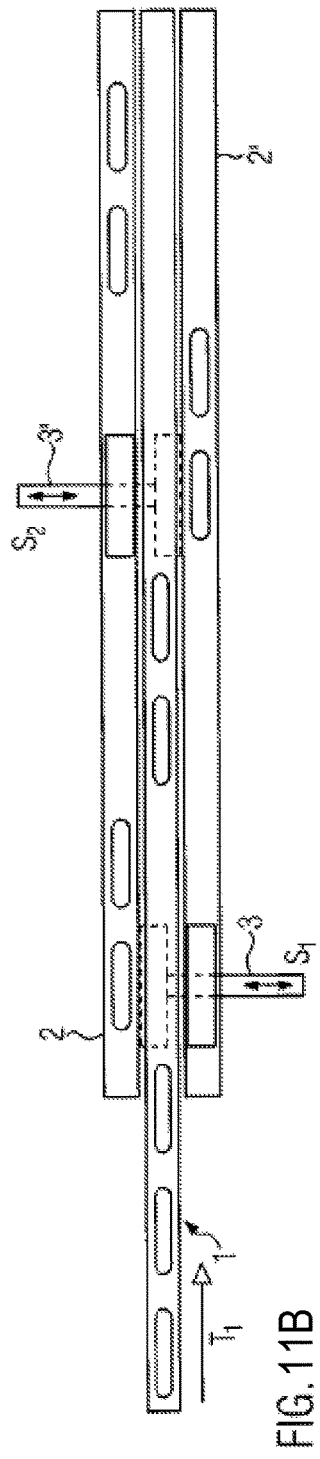
FIG. 11B shows the embodiment shown in FIG. 11A with a further grouping assignment.
Figure 11C:
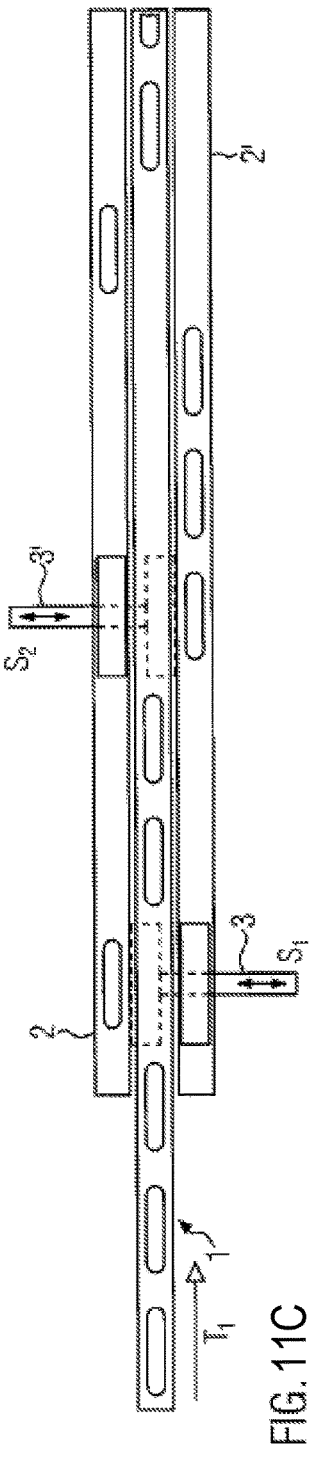
FIG. 11C shows the embodiment shown in FIGS. 11A and 11B with yet a further grouping assignment.

FIGS. 11A to 11C correspond to a further embodiment of the present invention in which, as explained in connection with FIG. 5, the removal transport angle β=0°, this means that the removal transport device or, as presently, the two removal transport devices extend parallel to the supply transport device. Also in this embodiment, there are two locations $S_1$ and $S_2$ at which the sausage portions are ejected from supply transport device 1 to removal transport device 2.

Ejector 3 can, for ejecting sausage portions 4, be moved from supply transport device 1 either above the respective removal transport device 2 and supply transport device 1 or, when a respective holding device is provided, can be guided between the transport device and the holding device for ejecting the sausage portion onto removal transport device 2'. The same applies to ejector 3' which can transfer the sausage portion from supply transport device 1 onto transport device 2'.

The product flow can there be divided into three lanes, where the division can be uniform but also numerically arbitrary. In FIG. 11A, a respective sausage portion is pushed onto removal transport device 2', the subsequent sausage portion remains on supply transport device 1 and the third sausage portion is by ejector 3' pushed onto removal transport device 2.

FIGS. 11B and 11C show further possible grouping options.

In the embodiments, in which β=0°, the sausage portions are in their longitudinal direction aligned in the direction of transport $T_2$ and not, as in the other embodiments, transversely or obliquely to the direction of transport $T_2$, where, as in the other embodiments, the distance b between the individual sausage portions can be influenced via the speed or the speed ratio of the supply transport device and the removal transport device.

It is also possible that faulty products such as ruptured sausage portions or those that differ from the desired length or from a desired shape are detected via a respective detection device, for example, a camera system that compares a recorded image with a reference image, and are discharged if it is detected that a faulty product is given, then an ejector is not actuated and does not push the sausage portion onto the removal transport device. In order to prevent that a gap arises on the removal transport device, the speed of the removal transport device can be adjusted accordingly, this means for example, that the speed can be delayed for a moment or the removal transport device can be stopped for a moment. The faulty products can then be discharged via supply transport device 1.

It is particularly advantageous if the direction of curvature of the sausages is detected and the sausages having a certain direction of curvature are ejected onto a respective removal transport device 2, this means that sausage portions having an opposite direction of curvature are ejected onto a further removal transport device or are removed via supply transport device 1. The curvature can be detected, for example, by a camera system or by distance measurement, in which the distance of the sausage surface is measured relative to a reference point, where the distance along the length of the sausage according to the curvature respectively changes for a certain curvature.

The holding device, in particular the transport roller or the conveyor belt of removal transport device 2 advantageously comprises no smooth surface but a surface profile, in particular lateral ribs (where the ribs are aligned perpendicular to the direction of transport $T_2$). This ensures that the sausages transferred to supply transport device 1 can be well gripped by the removal transport device.

An operation method according to the invention for the embodiments shown in the FIGS. 1-13 is described below. The control methods and routines disclosed herein may be stored as executable instructions in non-transitory memory and may be carried out by the controller in combination with the various sensors, actuators, and other hardware. The method includes ejecting at least one sausage portion from the supply transport device 1 onto the removal transport device, and holding and further transporting the at least one sausage portion between a lower transport device 5 of removal transport device 3 and a holding device 5 disposed thereabove.

In an example of the method, one or more sausage portions of the at least one sausage portion are ejected at several locations laterally from the supply transport device, where $n_1$ sausage portions are ejected successively at a first location $S_1$ onto said removal transport device by actuating an ejector successively a number $n_2$ of times, and where a certain number $n_3$ of sausage portions passing said first location $S_1$ without being ejected by said ejector is/are ejected at least at one further location by a respective ejector.

The method may further comprise detecting faulty products (e.g., ruptured or deformed sausage portions); not transferring said faulty products onto said removal transport device; discharging said faulty products at an end of said supply transport device; and adjusting a speed of the supply transport device, a speed of the removal transport device, and/or a speed of the ejecting to balance a number of sausage portions.

In an example, the method may further comprise detecting a direction of a curvature of said at least one sausage portion; and ejecting sausage portions having a certain direction of curvature onto a respective removal transport device.

The speeds v1, v2, and the respective point(s) in time at which the ejector(s) is/are actuated can be freely set, where supply transport device 1, the at least one removal transport device 1, and the at least one ejector 3 are actuated such that a particular grouping pattern is created on the at least one removal transport device 3.

For this purpose, a grouping assignment can be entered into the controller for the at least one removal transport device, where the following grouping parameter for the respective removal transport device can be entered: the number n of sausage portions in a group 12, the distance b between the sausage portions of a group 12, and the distance c between the groups 12.

The controller then in dependency of these parameters and a speed v1, which depends on the production rate and the length of the sausages, coordinates the functions of the removal transport belt and the ejector for the respective grouping assignment and controls the device accordingly.

The invention claimed is:
1. A device for transferring sausage portions, comprising:
 a supply transport device,
 at least one removal transport device, and
 at least one ejector for ejecting at least one sausage portion from said supply transport device onto said removal transport device,
 said removal transport device comprising a lower transport device and a holding device disposed thereabove between which said at least one sausage portion is transported; and a controller configured for actuating a drive of said removal transport device such that said removal transport device transports said sausage portions at a speed to adjust a predetermined distance between said sausage portions, where said speed depends on at least one of the following parameters: a transport speed of said supply transport device, a clock frequency of said ejector, a speed of said ejector, a sausage caliber, a set nominal distance of said sausage portions in a direction of transport $T_2$ of said removal transport device, a number of ejected portions, and a set nominal distance of sausage groups in the direction of transport $T_2$.

2. The device according to claim 1, wherein said holding device is arranged at least above a starting region of said transport device.

3. The device according to claim 2, wherein said holding device is formed as a circulating transport device, including a conveyor belt, a roller, a roller carpet, a sliding plate, or a resilient sliding plate.

4. The device according to claim 3, wherein said transport roller or said transport belt has a surface profile.

5. The device according to claim 1, wherein the distance between said holding device and said lower transport device is adjustable.

6. The device according to claim 1, wherein said supply transport device, at least in a transfer region, comprises a holding device above a transport device.

7. The device according to claim 1, wherein a sensor determines a position of said sausage portion and a sausage length at a point in time, and said controller, in dependence on respective signals, determines ejection timing and actuates said ejector.

8. The device according to claim 1, wherein said device comprises several successively arranged ejectors.

9. The device according to claim 1, wherein said at least one removal transport device extends in a second direction of transport $T_2$ at an angle of 0° to 100° relative to a direction of transport $T_1$ of said supply transport device.

10. The device according to claim 1, wherein said at least one removal transport device comprises several adjacently disposed circulating conveyor belts.

11. The device according to claim 1, wherein said ejector is configured and arranged such that said ejector is movable in a direction perpendicular to a direction of transport $T_1$ of said supply transport device or in a direction having a component of motion perpendicular to the direction of transport $T_1$ of said supply transport device and a component of motion opposite to the direction of transport $T_1$ of said supply transport device, and comprises a pivot mechanism, or an ejection area of said ejector is oriented at an angle or parallel to the direction of transport $T_1$ of said supply transport device and is movable linearly at an angle inclined relative to said supply transport device.

12. The device according to claim 1, wherein said device comprises a stop which is arranged at least in a starting region of said removal transport device and is positioned transverse to a direction of transport $T_1$ of said supply transport device in order to decelerate said sausage portions in the direction of transport $T_1$ of said supply transport device.

13. The device according to claim 1, wherein at least parts of said ejector are movable in or opposite to a direction of transport $T_1$ of said supply transport device.

14. A method for transferring sausage portions, comprising:

via a controller with instructions therein, ejecting with an ejector at least one sausage portion from a supply transport device laterally onto at least one removal transport device;

holding and further transporting the at least one sausage portion between a lower transport device of the removal transport device and a holding device disposed thereabove; and actuating a drive of the removal transport device such that the removal transport device transports the sausage portions at a speed to adjust a predetermined distance between the sausage portions, where the speed depends on at least one of the following parameters: a transport speed of the supply transport device, a clock frequency of the ejector, a speed of the ejector, a sausage caliber, a set nominal distance of the sausage portions in a direction of transport $T_2$ of the removal transport device, a number of ejected portions, and a set nominal distance of sausage groups in the direction of transport $T_2$.

15. The method according to claim 14, wherein one or more sausage portions of the at least one sausage portion are ejected at several locations laterally from the supply transport device, where $n_1$ sausage portions are ejected successively at a first location $S_1$ onto the removal transport device by actuating the ejector successively a number $n_2$ of times, and where a certain number $n_3$ of sausage portions passing the first location $S_1$ without being ejected by the ejector is/are ejected at least at one further location by a respective ejector.

16. The method according to claim 14, further comprising:

detecting faulty products;

not transferring the faulty products onto the removal transport device;

discharging the faulty products at an end of the supply transport device; and adjusting the speed of the supply transport device, a speed of the removal transport device, and/or a speed of the ejecting to balance a number of sausage portions.

17. The method according to claim 14, further comprising:

detecting a direction of a curvature of the at least one sausage portion; and ejecting sausage portions having a certain direction of curvature onto a respective removal transport device.

18. A device for transferring sausage portions comprising:

a supply transport device;

at least one removal transport device, the removal transport device comprising a lower transport device and a holding device disposed thereabove between which at least one sausage portion is transported;

at least one ejector for ejecting the at least one sausage portion from the supply transport device onto the removal transport device; and a controller including executable instructions in non-transitory memory for ejecting the at least one sausage portion via the ejector during the transfer from the supply transport device onto the removal transport device, and holding and further transporting the at least one sausage portion between the lower transport device of the removal transport device and the holding device disposed thereabove.

19. The device of claim 18, wherein the executable instructions in non-transitory memory further include instructions for ejecting the at least one sausage portion at several locations laterally from the supply transport device.

* * * * *